United States Patent [19]

Anav et al.

[11] 4,275,045
[45] Jun. 23, 1981

[54] METHOD OF EXTRACTION, TRAPPING AND STORAGE OF RADIOACTIVE IODINE CONTAINED IN IRRADIATED NUCLEAR FUELS

[75] Inventors: Maurice Anav, Villemoisson-sur-Orge; Jacques Duhayon, Clamart; Jean-Pierre Goumondy, Vitry-sur-Seine; André Leseur, Fontenay-aux-Roses; Edmond Zellner, Gif-sur-Yvette, all of France

[73] Assignee: Commissariat a l'Energie Atomique, Paris, France

[21] Appl. No.: 15,778

[22] Filed: Feb. 27, 1979

Related U.S. Application Data

[63] Continuation of Ser. No. 589,248, Jun. 23, 1975, abandoned.

[30] Foreign Application Priority Data

Jul. 3, 1974 [FR] France ................. 74 23139

[51] Int. Cl.³ .................. G21F 9/02; C01B 7/14; G21F 9/08; G21F 9/12
[52] U.S. Cl. ..................... 423/249; 252/301.1 W; 423/493; 423/494; 423/500; 423/501; 423/503

[58] Field of Search ............. 423/249, 20, 18, 500, 423/501, 503, 493, 494; 252/301.1 W

[56] References Cited

U.S. PATENT DOCUMENTS

| 3,018,159 | 1/1962 | Silverman | 423/249 |
|---|---|---|---|
| 3,429,655 | 2/1969 | Case | 423/249 |
| 3,803,295 | 4/1974 | Cathers et al. | 423/249 X |
| 3,914,388 | 10/1975 | Cathers et al. | 423/249 |
| 4,180,476 | 12/1979 | Anau et al. | 423/249 X |
| 4,201,690 | 5/1980 | Mills et al. | 252/301.1 W |
| 4,204,980 | 5/1980 | Pasha et al. | 252/301.1 W X |
| 4,206,073 | 6/1980 | Hesky et al. | 252/301.1 W |

Primary Examiner—Richard E. Schafer
Attorney, Agent, or Firm—Frishauf, Holtz, Goodman & Woodward

[57] ABSTRACT

After dissolving irradiated nuclear fuel in a nitric acid medium, the vapor produced by this dissolution and consisting of water, nitrogen oxides and iodine is passed into a condenser, then into a column for the absorption of the nitrous vapor in which is formed recombined nitric acid containing iodine and nitrous ions, the iodine contained in the recombined acid being then separated-out. The nitrous ions present in the recombined acid have a favorable influence on the important first stage of that separation.

10 Claims, 3 Drawing Figures

METHOD OF EXTRACTION, TRAPPING AND STORAGE OF RADIOACTIVE IODINE CONTAINED IN IRRADIATED NUCLEAR FUELS

This is a continuation of application Ser. No. 589,248, filed June 23, 1975 now abandoned.

This invention relates to a method of extraction, trapping and storage of the radioactive iodine contained in irradiated nuclear fuels.

At the time of irradiation of nuclear fuels, there are obtained among the different fission products the isotopes 127, 129 and 131 of iodine, the quantity and relative percentage of which depend on the neutron flux and on the time of residence of the fuel elements within the reactor.

The isotope 131 is a $\beta\gamma$-emitter having a half-life of 8.1 days whereas iodine-129 which is also a $\beta\gamma$-emitter can be considered as stable on the human scale since its half-life is $17.2 \times 10^6$ years.

By way of example, in the case of an oxide fuel of the type employed in LWR's (light-water reactors) and irradiated to 33,000 MWd per tonne, the total quantity of iodine per tonne of fuel is 270 g, 20% of which consists of iodine-127 and 80% consists of iodine-129, the proportion of iodine-131 being negligible.

After 150 days of cooling in the case of one tonne of fuel, the activity is 0.038 curie in the case of iodine-129 and 2.61 curie in the case of iodine-131.

Taking into account the considerable increase in the quantities and in the mean burnup level of fuels to be processed in the coming years as well as the trend in standards or permissible rejects towards values which are as low as possible, it proves necessary to trap iodine in a reliable and efficient manner in proportions which exceed 99.9%.

Tests concerned with processing of irradiated fuels have shown that a percentage of iodine of less than 10% escapes at the time of shearing of the fuel element whilst the greater part remains included in the oxide and is released only at the time of dissolution.

Studies pursued up to the present time have been chiefly concerned with trapping of iodine in the gaseous effluents.

There are thus many alternative methods in which recourse is had to:

scrubbing of gas with alkaline solutions having a base of sodium hydroxide, thiosulphate, hydrazine or the like, scrubbing with solutions of mercuric or mercurous-mercuric nitrate in a weakly acid ($10^{-3}$ to 1 M) nitric acid medium. The mercuric iodide $HgI_2$ or mercurous-mercuric iodide $Hg_2I_2\text{-}HgI_2$ is thus precipitated in the scrubbing tower, solutions of (0.1 to 0.4 M) mercuric nitrate in a 7 to 9 M nitric acid medium. There is thus formed an iodomercuric complex which is then destroyed in the hot state by concentrating the solution so as to precipitate the mercuric iodate $Hg(IO_3)_2$, highly concentrated solutions of 16 to 22 M nitric acid which oxidize the iodine to the iodic state $IO_3^-$ and the iodic anhydride $I_2O_5$ is then precipitated by concentration externally of the column.

There are finally a considerable number of methods of trapping on solid adsorbents and among these can be mentioned the active carbons, the zeolites or molecular sieves exchanged with silver and the catalytic supports impregnated with silver nitrate $AgNO_3$.

While they permit good iodine decontamination of the gaseous effluents, all these methods do not prevent the transfer of a substantial fraction of the iodine into the fuel dissolving solution, then into the solvent at the time of subsequent solvent extraction operations.

The invention is directed to a method of extraction, trapping and storage of radioactive iodine contained in irradiated nuclear fuels and is distinguished by the fact that, after dissolving the fuels in a nitric acid medium, the vapors resulting from this dissolution and consisting of water, nitrogen oxides and iodine are passed into a condenser, then into a column for the absorption of the nitrous vapors in which is formed recombined nitric acid containing iodine and nitrous ions, the iodine contained in the recombined acid being then separated-out under the favorable influence of the nitrous ions present in the recombined acid.

In a first embodiment of the method, separation of the iodine contained in the recombined acid is carried out by passing the recombined acid solution into a desorption column in counterflow to a carrier gas which is thereby loaded with iodine and the iodine thus trapped in said gas is then recovered.

The iodine can be extracted from the carrier gas by circulating this latter in counterflow to an alkaline solution to which is added a reducing agent in an absorption column.

The alkaline solution which leaves the absorption column receives an addition of a lead salt which precipitates the iodine in the form of lead iodide.

As an alternative to the above two steps, the iodine-loaded carrier gas may be passed into a scrubbing tower in counterflow to an alkaline and reducing solution containing a lead salt so as to form lead iodide in a single step.

As an alternative, the iodine-loaded carrier gas may be passed through a column containing a solid adsorbent exchanged with silver and chosen from the zeolites, the molecular sieves, the catalytic supports.

As still another alternative, iodine-loaded carrier gas is passed through a column in counterflow to a wash liquor which contains $Pb^{++}$ ions and to which is added a make-up quantity of lead nitrate and hydrazine nitrate so as to recover the iodine in the form of lead iodide crystals.

In a second embodiment of the method, in order to separate the iodine contained in the recombined acid, the solution which leaves the recombination column is passed into a distillation unit in which the iodine distils quantitatively in the presence of nitrous ions contained in the solution and is then separated-out by cooling.

The iodine crystals formed at the time of cooling are separated from the distillate for the purpose of longterm storage.

The iodine crystals are redissolved in an alkaline solution to which is added a reducing agent in order to transfer this solution to the effluent treatment station.

The alkaline solution containing the dissolved iodine receives an addition of a lead salt so as to precipitate the lead iodide which is conditioned for long-term storage in accordance with a third embodiment of the method.

The recombined acid is introduced into an organic solvent extractor which is then treated by being passed in counterflow to a wash liquor which contains $Pb^{++}$ ions and to which is added a make-up quantity of lead nitrate and of hydrazine nitrate so as to recover the iodine in the form of lead iodide crystals.

A wash liquor containing a copper salt can also be employed, in which case the iodine is precipitated in the form of coppr iodide.

In a third embodiment, the iodine is extracted from the carrier gas by an organic solvent.

Processes which are similar in some respects to the method in accordance with the invention are described in a number of patents and among these can be mentioned Belgian patent No. 788,022 and French patent No. 1,537,292.

The method described in the Belgian patent makes it possible to remove iodine from a gaseous atmosphere by countercurrent contacting with an aqueous nitric acid solution which can subsequently be distilled.

It is worthy of note that, in this method, the iodine is converted to iodate $IO_3^-$ which cannot readily be stored and that there is also formed $I_2O_5$ which is both unstable, hygroscopic and corrosive.

On the other hand, in the method according to the invention and as will again be pointed out later, the presence of $NO^-_2$ ions in the recombined acid has the effect of stabilizing the iodine in the elementary form $I_2$ which distils quantitatively.

The method described in the French patent which relates to the production of iodine-131 by irradiation of tellurium is closely related to the method according to the invention by the fact that is permits the recovery of iodine by distillation. However, this distillation can be carried out only by continuously adding hydrogen peroxide so as to convert the iodine to the elementary state and thus to permit quantitative distillation of this latter.

Further properties and advantages of the invention will become apparent from the following description of three embodiments of the method which are given with reference to the accompanying drawings, wherein.

At the time of dissolution of irradiated fuels in the dissolver 1, the nitrous vapors produced are recombined with a view to recovering the nitric acid which, when recovered, is passed back into the dissolver 1 either continuously or in a batch process.

The equilibrium constant [I] gas/[I] liquid and the relative flow rates of gas and of solution are such that the greater part of the iodine passes back into the recombined acid AR. Direct recycling 2 of this acid to the dissolver 1 therefore results in an accumulation of iodine which crystallizes locally within the condensation circuit 3 and absorption circuit 4 for the nitrous vapors, no matter which mode of continuous or periodic recycling is contemplated for the recombined acid.

The method according to the invention permits complete removal of the iodine contained in the recovered acid as well as trapping and storage of said iodine in a stable form.

Figure 1:
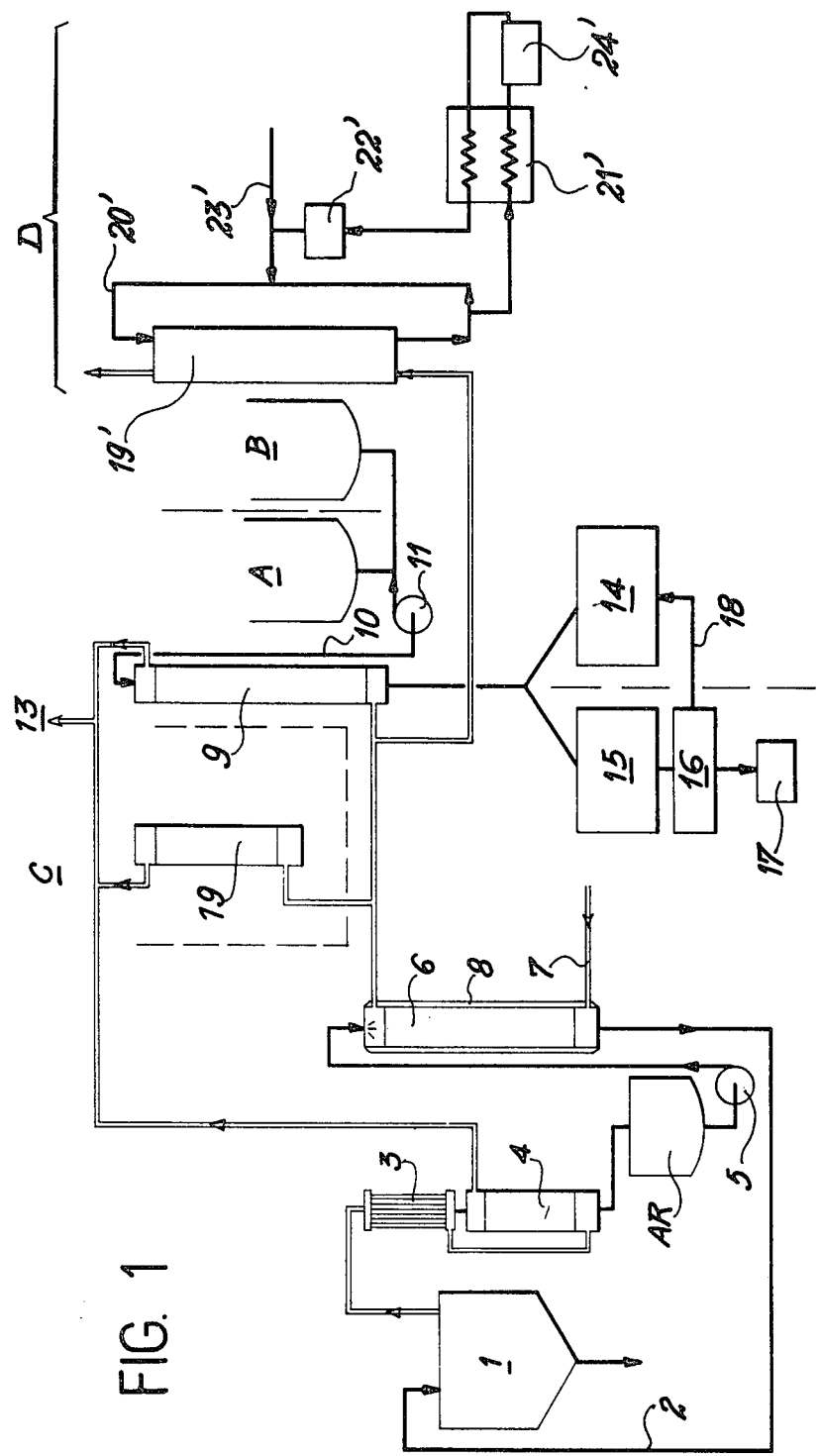
FIG. 1 is a diagram of an installation for countercurrent desorption of iodine by a carrier gas.

In a first embodiment (FIG. 1), the recombined acid AR which leaves the nitrous vapor absorption column 4 is passed by means of a pump 5 either continuously or batchwise from a collecting tank 4a to the top of a desorption column 6 of the packing type (Raschig rings, Berl saddles and the like) or of the plate type in counterflow to a "desorbent" gas which can be air or an inert gas and which enters the column through the pipe 7.

The column 6 can be heated by means of a jacket 8. A knowledge of the partition coefficients of the iodine between the recombined acid solution and the gas as a function of the operating temperature makes it possible to adjust the flow rates of gas and of solution so as to obtain a desorption factor which is considerably larger than 1.

The residual quantity of iodine in the acid after desorption depends only on the number of theoretical plates of the column and therefore both on the efficiency of the column packing and on the column height.

This accordingly makes it possible to obtain an iodine removal efficiency which is higher than 95%.

The acid thus treated can then be transferred to the dissolver or to any other point of the installation without any difficulty.

The iodine which is entrained in the gas stream can then be trapped in accordance with different variants.

VARIANT A

The gas circulates within a scrubbing tower 9 in counterflow to an alkaline and reducing solution A (sodium hydroxide+hydrazine or thiosulphate, etc.) which is fed to the tower by means of a pump 11 and the pipe 10. The gas is then evacuated through a pipe 12 to a purifying column 13 before being discharged.

The alkaline solution is then either sent to the effluent treatment unit 14 in which it is neutralized (pH 8.5) and in which the addition of a reducing agent stabilizes the iodine in solution in the form of iodide or treated at 15 by addition of a salt which produces an insoluble compound. This is followed by precipitation of the lead iodide $PbI_2$ which is very sparingly soluble and highly stable since its decomposition temperature exceeds 950° C. The lead iodide is retained on a filter 16.

After separation from the mother-liquors by filtration, said precipitate is passed to a solid-waste conditioning station 17 for long-term storage in the form of bituminous coated products. The precipitation mother-liquors 18 are sent to the effluent treatment unit 14.

VARIANT B

The gas to be freed from iodine is passed in counterflow to a solution B containing a salt which forms an insoluble compound such as lead iodide, for example. The column 9 can be heated in order to prevent formation of the precipitate within this latter, precipitation of the insoluble compound being obtained by cooling the solution outside the column. Separation of the precipitate of the mother liquors and their respective treatment take place as in the previous case.

VARIANT C

The gas containing the iodine passes within a column 19 over a bed of catalytic supports impregnated with silver nitrate or with silver-exchanged zeolites.

This variant permits high trapping efficiency but is undoubtedly the most costly.

In short, the advantage of this embodiment of the method lies in the fact that the operation is carried out on a small gas stream. This makes it possible to employ devices of small size and to increse their efficiency by virtue of the higher concentration of iodine in the gases to be treated.

VARIANT D

The gas containing the iodine passes within a column 19' heated to more than 50° C. in counterflow to a wash liquor 20' containing Pb++ ions. This liquor 20' which passes successively through the heat exchanger 21' and through the heater 22' receives at 23' a make-up quantity of lead nitrate and hydrazine nitrate prior to introduction into the top of the column 19'. At the bottom of this column, the liquor 20' is partly fed back to the top of the column and partly directed to the heat exchanger 21' and the cooler 24' in which the iodine precipitates in the form of PbI$_2$.

Figure 2:
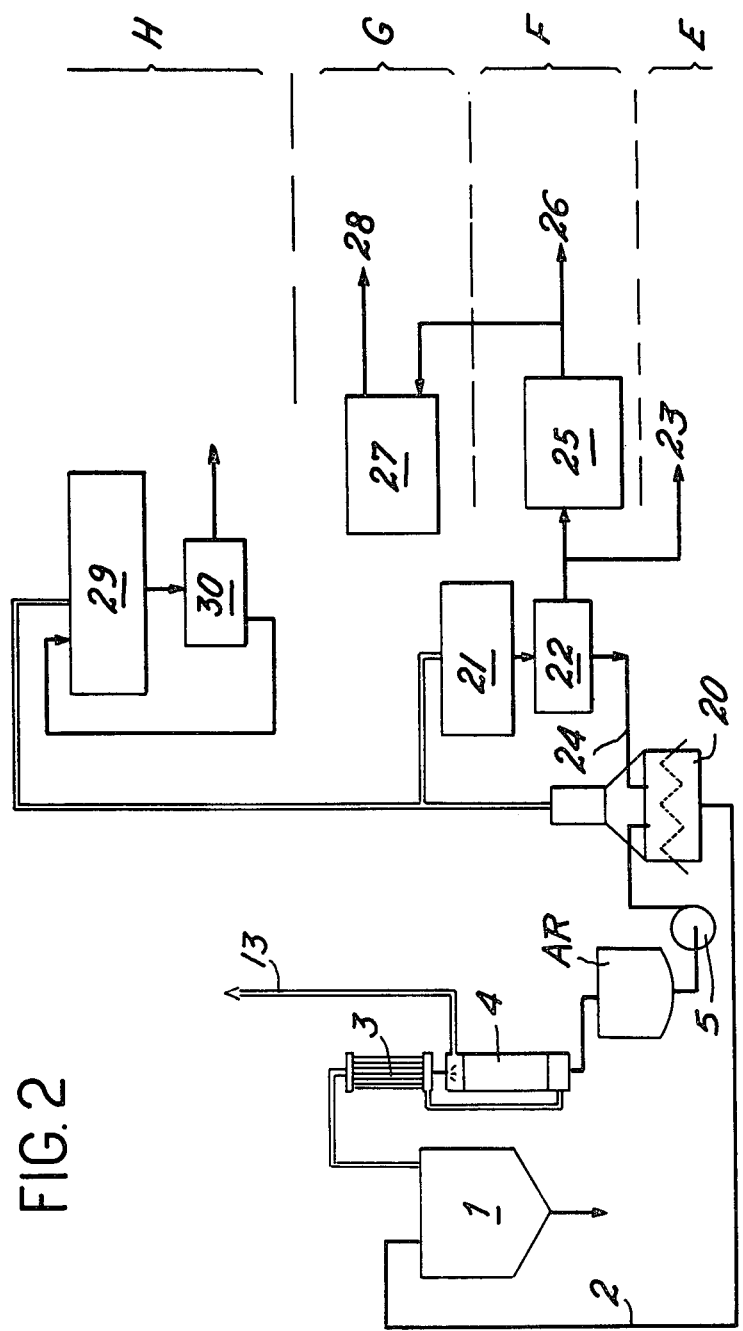
FIG. 2 is a diagram of an installation for the distillation of recombined acid loaded with iodine.

In a second embodiment of the method (FIG. 2), the recombined acid AR containing the iodine is passed into a distillation unit 20 in which it is brought to the boil. The iodine can be removed quantitatively by distilling less than 10% of the volume of acid solution by reason of the high vapor tension of iodine.

It has been possible to demonstrate the predominant influence of the nitrous $NO_2^-$ ions on the volatilization of iodine. In point of fact, these ions play the part of reducing agents and stabilize the iodine in the elementary form I$_2$ and prevent the formation of oxidized species such as the hypoiodites $IO^-$ or iodates $IO_3^-$.

The table hereunder gives a record of the decontamination factors obtained as a function of the volume percentage of distilled acid and of the proportion of nitrous ions, the initial proportion of iodine being $3\times10^{-3}$ M.

TABLE

| Volume percentage of initial distilled solution | initial $NO_2^-$ concentration | | | | |
|---|---|---|---|---|---|
| | $2.1\times10^{-6}$ M | $1.1\times10^{-2}$ M | $2.2\times10^{-2}$ M | $4.4\times10^{-2}$ M | $8.8\times10^{-2}$ M |
| 0 | 1 | 1 | 1 | 1 | 1 |
| 0.05 | 28 | 31 | 36 | 39 | 43 |
| 0.1 | 47.5 | 102 | 123 | 218 | 354 |
| 0.15 | 50 | 152 | 202 | 365 | 785 |
| 0.20 | 50 | 158 | 251 | 454 | 1230 |
| 0.25 | 50 | 158 | 252 | 500 | 1470 |

It can be noted that, in the case of 10% of distilled acid, there remains only 2% of iodine in respect of a proportion of $2.10^{-6}$ M of nitrous acid and less than 0.3% in respect of $8.8\times10^{-2}$ M of nitrous acid.

It should be pointed out that these nitrous ions exist naturally in the recombined acid, their concentration being dependent on the efficiency and conditions of oxidation and absorption of the nitrous vapors.

Recovery of iodine from the recombined acid takes place in different ways, a number of variants being given hereunder.

VARIANT E

The iodine is separated directly from the distillate by crystallization in the cold state at 21 followed by filtration at 22. In fact, the iodine has very low solubility (300 mg/l at 30° C.). There are thus obtained iodine crystals which can be treated at 23 either in order to be stored in leak-tight containers or to be conditioned for subsequent fabrication of sources of radioactive iodine 129$_I$.

The crystallization mother-liquors 24 are recycled in the distillation unit 20.

VARIANT F

The iodine crystals collected at the time of filtration at 22 are dissolved in an alkaline solution 25 with or without reducing agent.

This solution is neutralized and sent to the effluent treatment unit 26 as in the case of the variant A of the first embodiment of the method.

VARIANT G

Starting from the alkaline solution in which the iodine has been dissolved, an insoluble compound such as lead iodide PbI$_2$ is precipitated at 27 as in the first embodiment of the method. The mother liquors are sent to the effluent treatment unit at 28.

VARIANT H

The water vapor containing iodine is condensed directly at the exit of the distillation unit 20 in a solution containing a reducing agent and a salt which forms with the iodine an insoluble compound (such as PbI$_2$) in order to precipitate the formed compound at 29 and separate this latter directly by filtration at 30, the precipitation mother-liquors being recycled in the precipitation reactor at 29.

Figure 3:
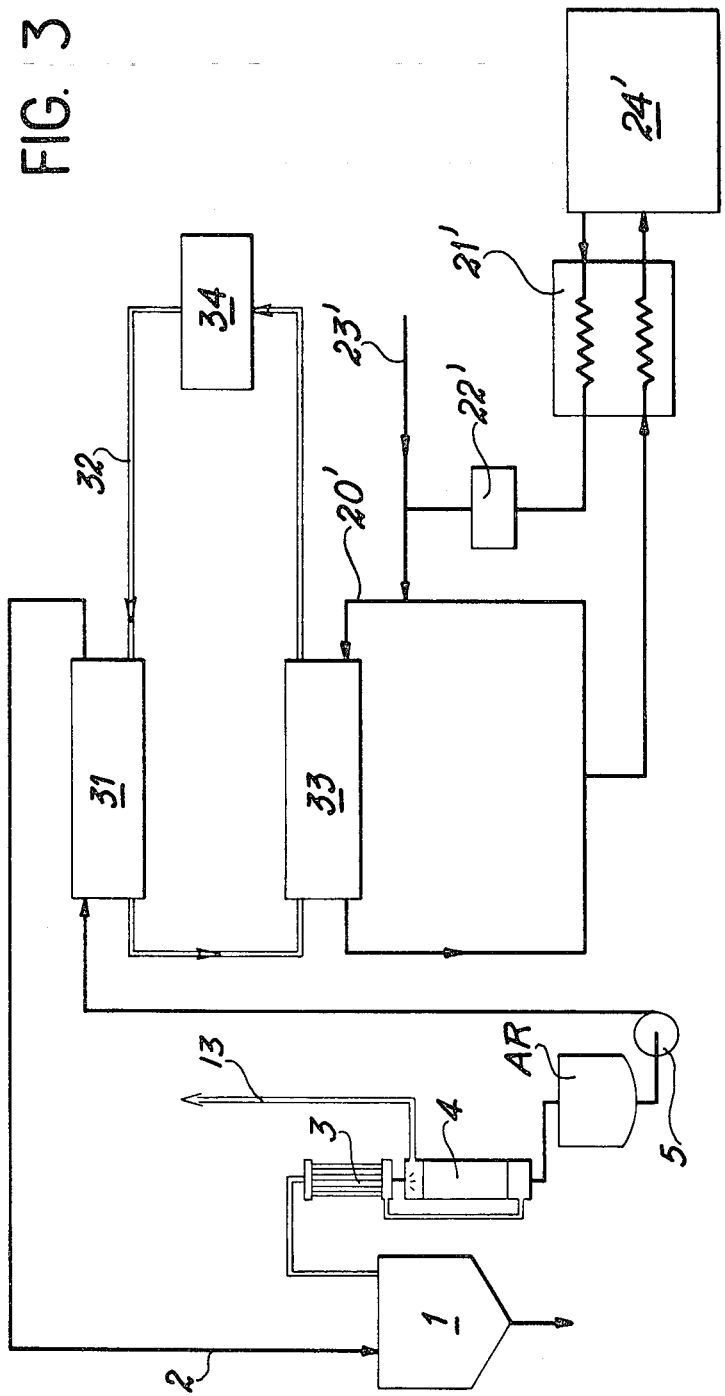
FIG. 3 is a diagram of an installation relating to solvent extraction of the iodine contained in the recombined acid.

In accordance with a third embodiment of the method (FIG. 3), the aqueous solution containing the recombined acid AR loaded with iodine is introduced by means of the pump 5 into an extractor 31 in which the solution is contacted with an organic solvent 32 which is thereby loaded with iodine. The iodine-loaded solvent is then introduced into a stripper 33 in which it is treated with the liquor 20' as in the variant D. The unloaded solvent is then directed to a treatment unit 34 prior to re-use in the extractor 31.

What we claim is:

1. A method of extraction, trapping and storage of radioactive iodine contained in irradiated nuclear fuels, comprising the steps of:
   dissolving the fuels in a nitric acid medium;
   passing the vapors resulting from this dissolution and consisting essentially of water, nitrogen oxides and elemental iodine into a condenser;
   passing the vapors coming out of the condenser into a first absorption column for the absorption of the nitrous vapors, in which column is formed recombined nitric acid containing elemental iodine and nitrous ions;
   separating out the iodine contained in the recombined acid from the acid in the presence of $NO_2^-$ ions in the recombined acid, and
   recovering the iodine in a storable form.

2. A method according to claim 1, wherein separation of the iodine contained in the recombined acid is carried out by passing the recombined acid solution into a desorption column in counterflow to a carrier gas which is thereby loaded with iodine and the iodine thus trapped in said gas is then recovered in a second absorption column.

3. A method according to claim 2, wherein the iodine is extracted from the carrier gas in said second absorption column by circulating said gas in counterflow to an alkaline solution to which is added a reducing agent.

4. A method according to claim 10, wherein the alkaline solution which leaves the second absorption column receives an addition of a lead salt which precipitates the iodine in the form of lead iodide.

5. A method according to claim 10, wherein the alkaline solution which leaves the second absorption column receives an addition of a copper salt which precipitates the iodine in the form of copper iodide.

6. A method according to claim 2, wherein the iodine-loaded carrier gas is passed through a second absorption column containing a solid adsorbent exchanged with silver and chosen from the zeolites, the molecular sieves, and the catalytic supports.

7. A method acording to claim 1, wherein in order to separate the iodine contained in the recombined acid, the recombined acid solution which leaves the first absorption column is passed into a dititllation unit and the iodine is then distilled off in the presence of nitrous ions contained in the solution and is thereafter separated out by cooling and wherein the iodine crystals formed at the time of cooling are separated from the distillate for the purpose of long-term storage.

8. A method according to claim 7, wherein the iodine crystals are dissolved in an alkaline solution to which is added a reducing agent in order to transfer this solution to the effluent treatment station.

9. A method according to claim 1, wherein, in order to separate the iodine contained in the recombined acid, the recombined acid solution which leaves the first absorption column is passed into a distillation unit and the iodine is then distilled off in the presence of nitrous ions contained in the solution and is thereafter separated-out by cooling, and wherein the iodine crystals formed by the cooling step are dissolved in an alkaline solution and wherein said alkaline solution containing the dissolved iodine then receives an addition of a lead salt so as to precipitate the lead iodide, which is then conditioned for long-term storage.

10. A method of extraction, trapping and storage of radioactive iodine contained in the irradiated nuclear fuels, comprising the steps of:
dissolving the fuels in a nitric acid medium;
passing into a condenser the vapors resulting from this dissolution and consisting essentially of water, nitrogen oxides and iodine;
passing the vapors issuing from the condenser into a first column for the absorption of the nitrous vapors, in which column is formed recombined nitric acid containing nitrous ions and iodine;
passing the recombined acid into a desorption column in counterflow to a carrier gas which is thereby loaded with iodine;
circulating said gas in a second absorption column in counterflow to an alkaline solution in which a reducing agent is added in said second absorption column, and
providing to the alkaline solution which leaves the second absorption column an addition of a metal salt, selected from the group consisting of soluble lead salts and soluble copper salts, which precipitates the iodine in the form of the corresponding iodide.

* * * * *